(12) United States Patent
Gallagher

(10) Patent No.: US 6,181,644 B1
(45) Date of Patent: Jan. 30, 2001

(54) DIVER MASK UNDERWATER IMAGING SYSTEM

(75) Inventor: Dennis Gallagher, Panama City, FL (US)

(73) Assignee: The United States of America as represented by the Secretary of the Navy, Washington, DC (US)

( * ) Notice: Under 35 U.S.C. 154(b), the term of this patent shall be extended for 0 days.

(21) Appl. No.: 09/285,174

(22) Filed: Mar. 18, 1999

(51) Int. Cl.$^7$ .................................................. H04B 11/00
(52) U.S. Cl. ............................................. 367/131; 367/910
(58) Field of Search ..................................... 367/910, 120, 367/131, 134, 11, 7

(56) References Cited

U.S. PATENT DOCUMENTS

| | | | |
|---|---|---|---|
| 3,784,805 | * | 1/1974 | Rolle ........................................ 367/11 |
| 3,800,273 | * | 3/1974 | Rolle ....................................... 367/910 |
| 5,293,351 | * | 3/1994 | Noponen ..................................... 367/7 |
| 5,420,828 | * | 5/1995 | Geiger ..................................... 367/131 |

\* cited by examiner

*Primary Examiner*—Ian J. Lobo
(74) *Attorney, Agent, or Firm*—Harvey A. Gilbert; Donald G. Peck

(57) ABSTRACT

An underwater imaging system includes a scuba facemask having a viewing portion that defines a user field-of-view. An imager generates image data of an area in an imaging field-of-view. The imager is coupled to the facemask such that the imaging field-of-view at least partially overlaps the user field-of-view. A display mounted in a lower portion of the user field-of-view is coupled to the imager for displaying images to the user based on the image data.

44 Claims, 4 Drawing Sheets

DIVER MASK UNDERWATER IMAGING SYSTEM

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to underwater imaging systems, and more particularly to an underwater imaging system that is integrated with a scuba diver's facemask.

BACKGROUND OF THE INVENTION

Underwater imaging by scuba divers for purpose of search and recovery, video and photographic documentation, underwater mine reconnaissance and/or research has relied on hand-held video cameras, still cameras or sonar devices. However, the hand-held devices tend to be large and bulky, and typically incorporate a display that can be difficult to see underwater. Further, the divers hand or hands are constantly preoccupied with manipulating the imaging device. Still further, the diver must align the device's field-of-view with his own line-of-sight in order to image an area of concern.

SUMMARY OF THE INVENTION

Accordingly, it is an object of the present invention to provide an underwater imaging system.

Another object of the present invention is to provide a hands-free underwater imaging system for use by a scuba diver.

Still another object of the present invention is to provide a underwater imaging system that presents the diver with easily viewed images.

Yet another object of the present invention is to provide an underwater imaging system that provides a scuba diver with good quality images regardless of water visibility.

Other objects and advantages of the present invention will become more obvious hereinafter in the specification and drawings.

In accordance with the present invention, an underwater imaging system is based on a scuba facemask having a viewing portion through which a user can see. The facemask fixes the viewing portion in front of the user's eyes to define a user field-of-view. The user field-of-view changes when the user moves his head. An imager (e.g., sonar, video camera, digital camera, etc.) having an imaging field-of-view generates image data of an area in the imaging field-of-view. The image is coupled to the facemask such that the imaging field-of-view at least partially overlaps the user field-of-view. A display is mounted in the user field-of-view and is coupled to the imager for displaying images to the user based on the image data.

DETAILED DESCRIPTION OF THE INVENTION

Figure 1:
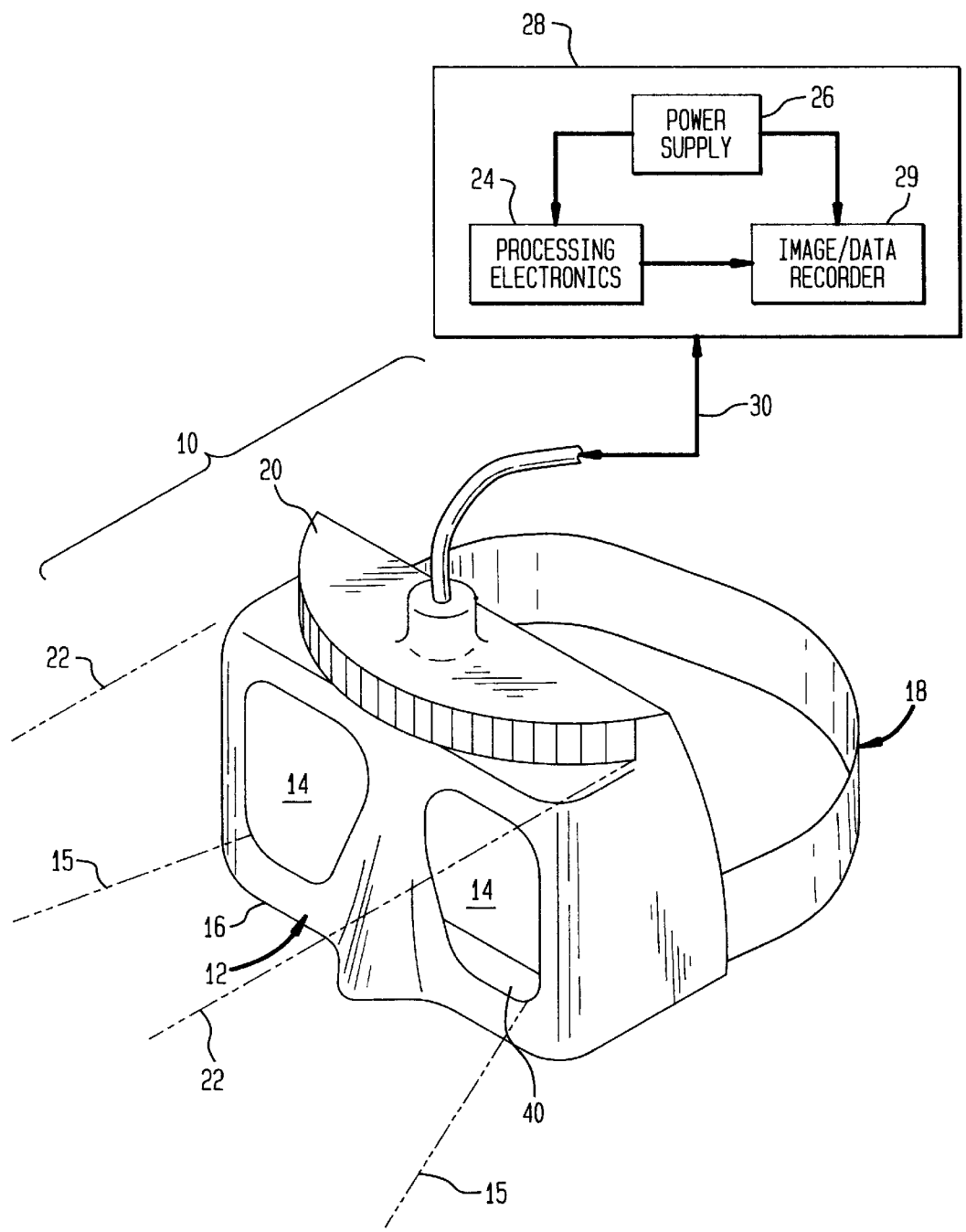
FIG. 1 is a diagrammatic view of a sonar imaging embodiment of the present invention.

Referring now to the drawings, and more particularly to FIG. 1, one embodiment of an underwater imaging system according to the present invention is shown and referenced generally by numeral 10. Underwater imaging system 10 is configured to produce a sonar image for a scuba diver. However, as will be explained further below, the present invention can also be configured to produce an underwater video image or digital photographic image.

Underwater imaging system 10 is based on a scuba divers facemask 12, the particular design of which is not a limitation on the present invention. In general, facemask 12 has a view window(s) or lens(es) 14 having its position fixed in front of a user's eyes by a circumferential sealing portion 16 that conforms to and seals against a user's face as is known in the art. Typically, sealing portion 16 is held in place by means of a head strap (or straps) 18 that fits around the user's head.

Sonar image data is generated by a sonar device (e.g., a sonar array) 20 mounted, for example, atop face mask 12. Sonar device 20 can be integrated into the structure of facemask 12 or could be attachable to facemask 12 as a modular unit. Either way, sonar device 20 has a field-of-view falling between dashed lines 22 in which sonar image data is generated. Field of view 22 can be larger or smaller than the user's field-of-view which falls between dashed lines 15 and is defined by the configuration of view window(s) 14 of facemask 12. Sonar device 20 can be configured such that field-of-view 22 is overlapped completely by field-of-view 15, is overlapped partially by field-of-view 15 or coincides with field-of-view 15. In this way, sonar image data is generated for objects/areas being observed by the user.

Sonar device 20 incorporates sonar processing electronics (not shown) to format raw sonar data into image data as is known in the art. If there is insufficient room for such electronics atop facemask 12, sonar processing electronics 24 and a power supply 26 could be remotely located in a pack or housing 28 worn by the user or attachable to a piece of the user's equipment. If desired, an image recording device 29 can also be included (e.g., in housing 28) and coupled to processing electronics 24 to record the sonar image data. A cable 30 could be used to electrically couple electronics 24 and power supply 26 to sonar device 20. Power supply 26 could be rechargeable batteries, seawater-activated batteries, etc.

Sonar image data generated by processing electronics 24 is fed to a miniature display 40 mounted on, or integrated into, facemask 12. Display 40 is positioned in the user's field-of-view 15 in such a way that it will not obstruct the general viewing area defined by field-of-view 15. Typically, display 40 is mounted so that it can be viewed in a lower left (as shown) or lower right area of field-of-view 15 to allow the user to view the (sonar) image simply by glancing downward and slightly outboard to the left or right as the case may be. As will be explained further below, display 40 includes either a monochrome or color miniature flat panel display screen (or microdisplay screen as it is known in the art). Microdisplay screens are available commercially from a variety of companies such as Planar Systems, Beaverton, Oreg.; Microdisplay Corporation, San Pablo, Calif.; and DisplayTech, Longmont, Co.

Figure 2:
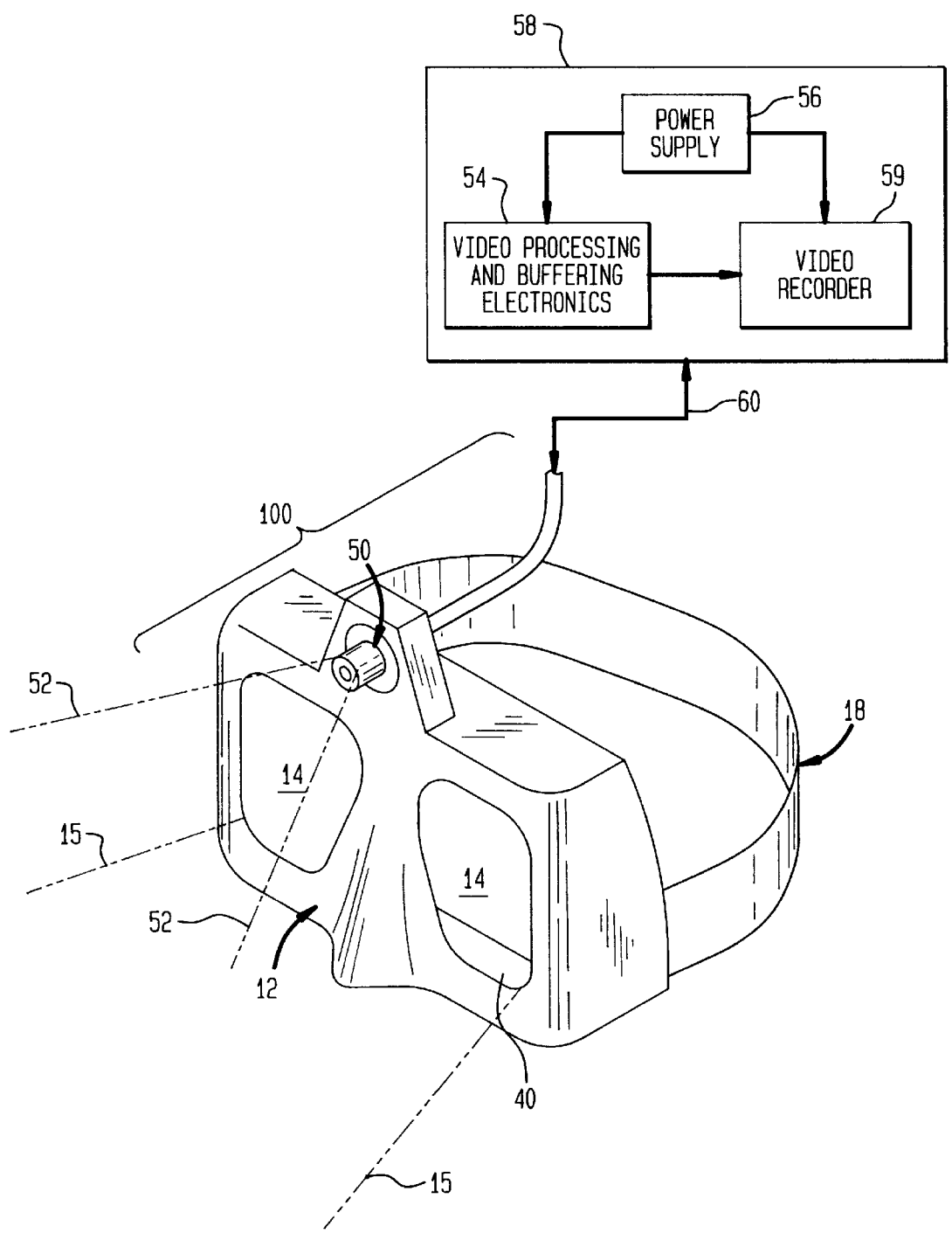
FIG. 2 is a diagrammatic view of a video imaging embodiment of the present invention.

As mentioned above, the present invention can also (i.e., alternatively or simultaneously) be configured to produce a video image of objects/areas of concern underwater. This embodiment of the present invention is illustrated in FIG. 2 where the same reference numbers will be used for those elements that are common with imaging system 10 in FIG. 1. In FIG. 2, underwater imaging system 100 uses a video camera 50 mounted, for example, atop facemask 12. Video camera 50 can be integrated into the structure of facemask 12 or could be attachable to facemask 12 as a modular unit. Either way, video camera 50 has a field-of-view falling between dashed lines 52 and is analogous to field of view 22 in the embodiment shown in FIG. 1. Typically, video camera 50 is mounted centrally relative to field-of-view 15 to allow the user to film objects/area of concern within the user's eye view which are viewable on display 40.

Video camera 50 can be a self-contained miniature color video board camera (e.g., CMOS based) with an integral fixed focus lens. If necessary, video processing and buffering electronics 54 and a power supply 56 could be remotely located in a pack or housing 58 worn by the user or attachable to a piece of the user's equipment. In such a case, a cable 60 is used to electrically couple electronics 54 and power supply 56 to video camera 50. A video recorder 59 could also be included in housing 58 to record the video images being viewed on display 40, or the video image could be sent to the surface via an umbilical cable (not shown).

Figure 3:
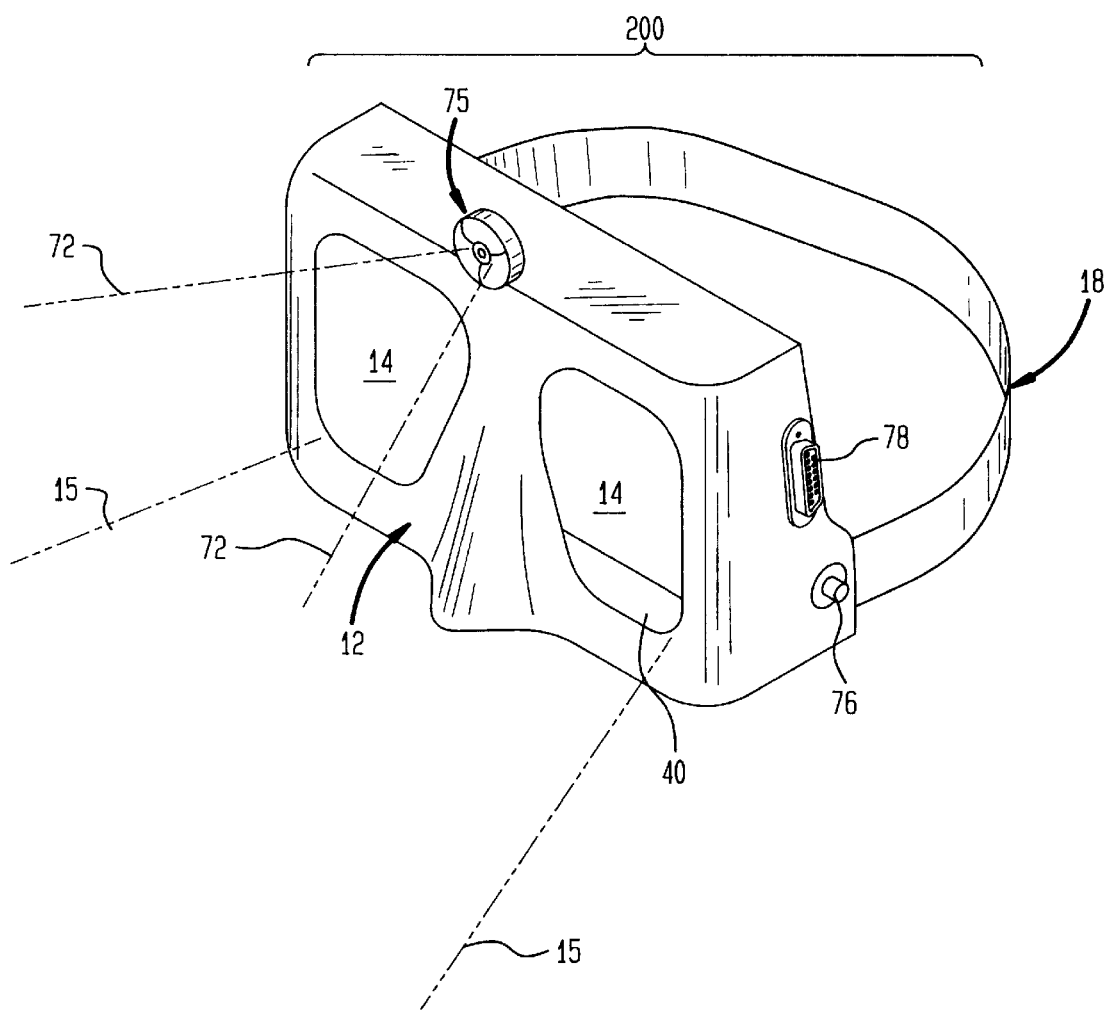
FIG. 3 is a diagrammatic view of a digital still camera imaging embodiment of the present invention.

As mentioned above, the present invention can also be configured to produce a digital photographic image of objects/areas of concern underwater. This embodiment of the present invention is illustrated in FIG. 3 where the same reference numbers will be used for those elements that are common with imaging system 10 in FIG. 1. In FIG. 3, underwater photographic system 200 uses a digital camera 75 mounted, for example, atop facemask 12. Digital camera 75 can be integrated into the structure of facemask 12 or could be attachable to facemask 12 as a modular unit. Either way, video camera 75 has a field-of-view falling between dashed lines 72 and is analogous to field of view 22 in the embodiment shown in FIG. 1. Typically, digital camera 75 is mounted centrally relative to field-of-view 15 to allow the user to photograph objects/area of concern within the user's eye view which are viewable on display 40.

Digital camera 75 can be a self-contained miniature black and white or color digital camera system with an integral fixed focus lens. Controls and power for digital camera 75 can be integrated into facemask 12 or could be remotely located in a pack or housing (not shown) worn by the user or attachable to a user's piece of equipment. For example, a shutter control switch 76 could be integrated into facemask 12 or could be located in a remote pack. A computer interface port 78 could also be integrated into facemask 12 (or could be located in a remote pack) so that digital photographs could be downloaded to a computer or other storage media.

Figure 4:
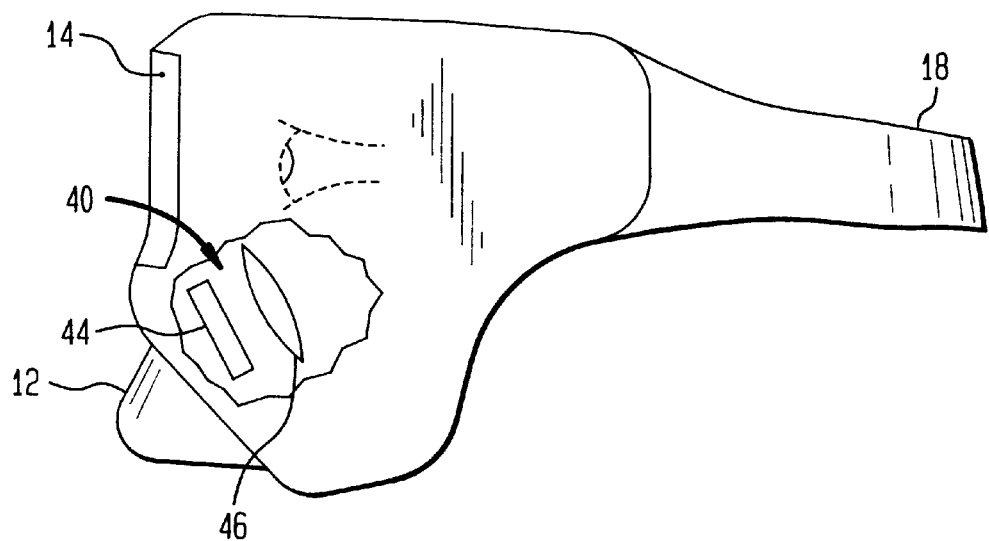
FIG. 4 is a cutaway schematic view of one embodiment of the display used in the present invention as it would be mounted integral to the inside of a scuba diver's facemask.

In each embodiment, display 40 utilizes a display screen that produces a highly miniaturized image. Thus, it is necessary to provide optics that will magnify the display screen image. One way of doing this is illustrated schematically in FIG. 4 where display 40 is shown integrated into the structure of facemask 12. A microdisplay screen 44 and an optical lens 46 are encased and sealed within the structure of facemask 12. More specifically, lens 46 is positioned between microdisplay screen 44 and the user's eye in order to provide a magnified virtual image of the images appearing on screen 44. It is to be understood that optical lens 46 is representative of one or more lenses needed to produce the magnified virtual image. A user-accessible adjustment can be provided as indicated by two-headed arrow 48, as shown in FIG. 5, to adjust the focus of lens 46.

Figure 5:
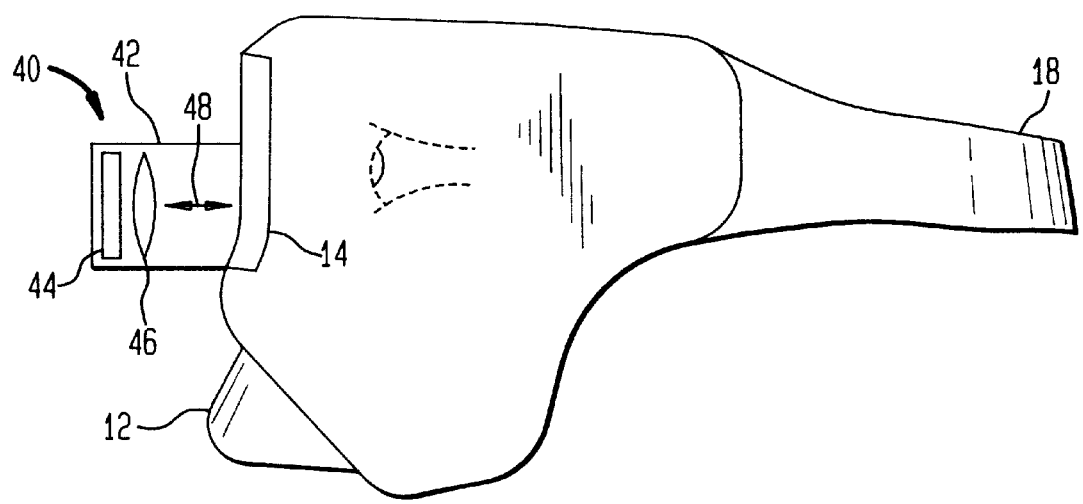
FIG. 5 is a side schematic view of one embodiment of the display used in the present invention as it would be mounted external to a scuba diver's facemask.

An alternative display arrangement is illustrated schematically in FIG. 5 where display 40 is shown attached to the outside (or wet side as it is known) of facemask 12. In this embodiment, a water-tight housing 42 is attached to facemask 12 to encase microdisplay screen 44 and lens 46.

The advantages of the present invention are numerous. Underwater sonar, digital photography and/or video imaging capabilities are incorporated into a scuba diver's facemask to allow for completely hands-free underwater imaging. The imaging apparatus is coupled to the diver's facemask such that imaging automatically occurs within the diver's field-of-view. Thus, a diver's instinctive line-of-sight observations are immediately viewable and/or capturable. Since the display is located at the diver's facemask (i.e., just inside or outside of the facemask's viewing window), problems associated with water visibility are completely eliminated.

Although the invention has been described relative to a specific embodiment thereof, there are numerous variations and modifications that will be readily apparent to those skilled in the art in light of the above teachings. For example, both sonar and video imaging capability could be included on a facemask. Also, the display could be coupled to another remotely located video source (e.g., at the water's surface) to provide additional information/instruction to the scuba diver. Displays could be provided at both the lower left and lower right areas of the user's field-of-view. It is therefore to be understood that, within the scope of the appended claims, the invention may be practiced other than as specifically described.

What is claimed as new and desired to be secured by Letters Patent of the United States is:

1. An underwater imaging system comprising:
   a scuba facemask having a viewing portion through which a user can see, said facemask fixing said viewing portion in front of said user's eyes to define a user field-of-view wherein said user field-of-view changes when said user moves his head;
   an imager having an imaging field-of-view, said imager generating image data of an area in said imaging field-of-view, said imager coupled to said facemask such that said imaging field-of-view at least partially overlaps said user field-of-view; and
   a display mounted in a lower portion of said user field-of-view wherein said user field-of-view remains substantially unobstructed at all times, said display coupled to said imager for displaying images to said user based on said image data.

2. A system as in claim 1 wherein said imager is a sonar-based imager.

3. A system as in claim 2 wherein said display comprises:
   a microdisplay screen for reproducing said images; and
   at least one optical lens disposed between said micro display screen and said user's eyes to magnify said images for said user.

4. A system as in claim 3 wherein said microdisplay screen is a monochrome display screen.

5. A system as in claim 3 wherein said microdisplay screen is a color display screen.

6. A system as in claim 2 further comprising an image recorder coupled to said imager for recording said images.

7. A system as in claim 2 wherein said imager is attachable to said facemask.

8. A system as in claim 2 wherein said imager is integral with said facemask.

9. A system as in claim 2 wherein said imager is coupled to said facemask such that said imaging field-of-view is completely overlapped by said user field-of-view.

10. A system as in claim 2 wherein said imager is coupled to said facemask such that said imaging field-of-view coincides with said user field-of-view.

11. A system as in claim 1 wherein said imager is a video camera.

12. A system as in claim 1 wherein said imager is a digital still camera.

13. A system as in claim 1 wherein said display comprises: a microdisplay screen for reproducing said images; and at least one optical lens disposed between said microdisplay screen and said user's eyes to magnify said images for said user.

14. A system as in claim 13 wherein said microdisplay screen is a monochrome display screen.

15. A system as in claim 13 wherein said microdisplay screen is a color display screen.

16. A system as in claim 1 further comprising an image recorder coupled to said imager for recording said images.

17. A system as in claim 1 wherein said imager is attachable to said facemask.

18. A system as in claim 1 wherein said imager is integral with said facemask.

19. A system as in claim 1 wherein said imager is coupled to said facemask such that said imaging field-of-view is completely overlapped by said user field-of-view.

20. A system as in claim 1 wherein said imager is coupled to said facemask such that said imaging field-of-view coincides with said user field-of-view.

21. An underwater imaging system comprising:
  a scuba facemask having a viewing portion through which a user can see, said facemask fixing said viewing portion in front of said user's eyes to define a user field-of-view wherein said user field-of-view changes when said user moves his head;
  an imager having an imaging field-of-view, said imager generating image data of an area in said imaging field-of-view, said imager coupled to said facemask such that said imaging field-of-view at least partially overlaps said user field-of-view;
  display means coupled to said facemask and viewable by said user at one or both of a lower left area and a lower right area of said user field-of-view wherein said user field-of-view remains substantially unobstructed at all times, said display means coupled to said imager for displaying images to said user based on said image data; and
  a power supply coupled to said imager and said display means for supplying power thereto.

22. A system as in claim 21 wherein said power supply comprises rechargeable batteries.

23. A system as in claim 21 wherein said display means is mounted on a wet side of said facemask, said system further comprising a water-tight housing encasing said display means.

24. A system as in claim 21 wherein said imager comprises:
  a sonar array having said imaging field-of-view mounted atop said facemask wherein said image data is sonar data; and
  a sonar processor coupled between said sonar array and said display means for formatting said sonar data for display as said images.

25. A system as in claim 24 wherein said power supply comprises rechargeable batteries.

26. A system as in claim 24 wherein said display means is mounted on a wet side of said facemask, said system further comprising a water-tight housing encasing said display means.

27. A system as in claim 24 wherein said display means comprises:
  a microdisplay screen for reproducing said images; and
  at least one optical lens disposed between said microdisplay screen and said user's eyes to magnify said images for said user.

28. A system as in claim 27 wherein said microdisplay screen is a monochrome display screen.

29. A system as in claim 27 wherein said microdisplay screen is a color display screen.

30. A system as in claim 24 further comprising an image recorder coupled to said imager for recording said images.

31. A system as in claim 24 wherein said imager is attachable to said facemask.

32. A system as in claim 24 wherein said imager is integral with said facemask.

33. A system as in claim 24 wherein said imager is coupled to said facemask such that said imaging field-of-view is completely overlapped by said user field-of-view.

34. A system as in claim 24 wherein said imager is coupled to said facemask such that said imaging field-of-view coincides with said user field-of-view.

35. A system as in claim 21 wherein said imager is a video camera.

36. A system as in claim 21 wherein said imager is a digital still camera.

37. A system as in claim 21 wherein said display means comprises:
  a microdisplay screen for reproducing said images; and
  at least one optical lens disposed between said microdisplay screen and said user's eyes to magnify said images for said user.

38. A system as in claim 37 wherein said microdisplay screen is a monochrome display screen.

39. A system as in claim 37 wherein said microdisplay screen is a color display screen.

40. A system as in claim 21 further comprising an image recorder coupled to said imager for recording said images.

41. A system as in claim 21 wherein said imager is attachable to said facemask.

42. A system as in claim 21 wherein said imager is integral with said facemask.

43. A system as in claim 21 wherein said imager is coupled to said facemask such that said imaging field-of-view is completely overlapped by said user field-of-view.

44. A system as in claim 21 wherein said imager is coupled to said facemask such that said imaging field-of-view coincides with said user field-of-view.

* * * * *